US005468908A

United States Patent [19]

Arthur et al.

[11] Patent Number: 5,468,908
[45] Date of Patent: Nov. 21, 1995

[54] FLOOR BOX FOR IN-FLOOR SERVICE DISTRIBUTION SYSTEMS

[75] Inventors: Richard L. Arthur, Vienna, W. Va.; Timothy S. Bowman, Memphis, Tenn.; J. David Harmon, Pittsburgh, Pa.

[73] Assignee: Walker Systems, Inc., Parkersburg, W. Va.

[21] Appl. No.: 179,247

[22] Filed: Jan. 10, 1994

Related U.S. Application Data

[63] Continuation-in-part of Ser. No. 722,872, Jun. 28, 1991, Pat. No. 5,285,009.
[51] Int. Cl.$^6$ ................................................. H02G 3/08
[52] U.S. Cl. .............................................................. 174/48
[58] Field of Search ......................... 174/48, 49; 52/220.1

[56] References Cited

U.S. PATENT DOCUMENTS

| | | | |
|---|---|---|---|
| 4,536,612 | 8/1985 | Domigan | 174/48 |
| 4,726,159 | 2/1988 | Stohs | 174/48 X |
| 4,800,237 | 1/1989 | Mohr | 174/48 |
| 5,179,252 | 1/1993 | Yang | 174/48 |
| 5,285,009 | 2/1994 | Bowman et al. | 174/48 |

Primary Examiner—Leo P. Picard
Assistant Examiner—David Tone
Attorney, Agent, or Firm—McAndrews, Held & Malloy, Ltd.

[57] ABSTRACT

This patent discloses a floor box for use with in-floor service distribution systems. The floor box defines wiring compartments in which connectors may be mounted and is constructed so that conductors can be routed through the floor box from one wiring compartment to another. The floor box also accepts barriers that are selectively positioned in the floor box to separate conductors in separate wiring compartments. The floor box accepts connectors of different services is constructed to facilitate assembly of connectors and mounting hardware as well as routing conductors through the floor box.

10 Claims, 4 Drawing Sheets

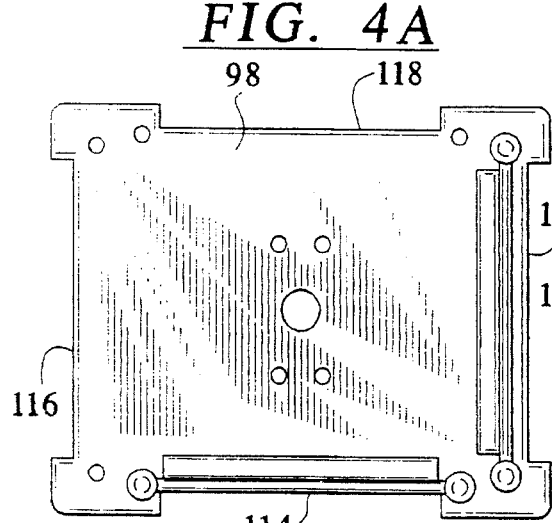
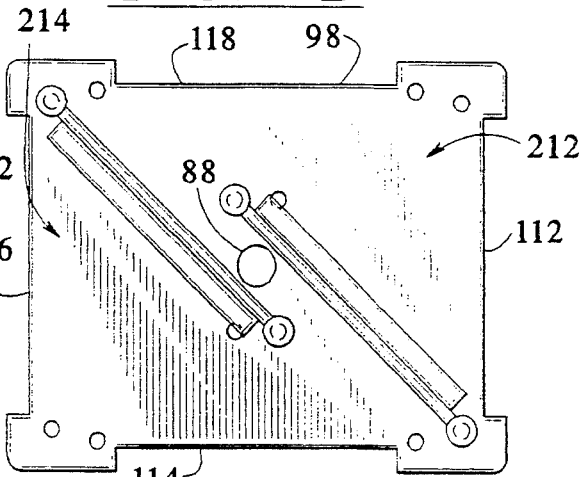

FLOOR BOX FOR IN-FLOOR SERVICE DISTRIBUTION SYSTEMS

This application is a continuation-in-part of application Ser. No. 07/722,872 which was filed on Jun. 28, 1991, now U.S. Pat. No. 5,285,009.

BACKGROUND OF THE INVENTION

The present invention relates to floor boxes for use with in-floor service distribution systems in concrete floors and more particularly to a floor box that can be used for activation of one or more services such as power, communication, or data.

Service distribution systems embedded in floors provide services to locations on the floor. Connections to services, or activation of services, from such distribution systems may be made through a hole in the floor surface providing access to a floor box embedded in the floor and connected to one or more service distribution systems.

Floor boxes known in the art that are adapted for connection to distribution systems, such as conduit, have provided limited connections to in-floor service distribution systems and limited flexibility in configuring the connections to distribution systems. Because limited connections are available, the number of services to which access may be provided is limited as are options for routing connectors through conventional floor boxes. These limitations complicate assembly of the distribution system. In addition, installation of connectors and other activation hardware in floor boxes conventionally requires assembly of a significant portion of the activation hardware in such boxes making installation time consuming and expensive.

Another consideration in assembly of some service distribution systems embedded in concrete floors is the requirement that the system be water-tight. Such systems are conventionally required in on-grade floors. Water-tight floor boxes for such systems have been made, at least in part, of cast iron. Such floor boxes share the above described disadvantages and are more expensive than those not required to be water-tight making installation of additional floor boxes an even greater disadvantage for water-tight systems than for systems that are not water tight.

A need therefore exists for a floor box which accommodates a greater number of connectors and service conductors and allows greater flexibility for connector configuration and conductor routing than prior floor boxes. There is also a need for a floor box in which connectors can be installed with less assembly and disassembly of activation hardware than is required for installation in prior floor boxes. A need also exists for a floor box which allows greater flexibility in routing conductors through the floor box to connectors within the box and to service distribution systems connected to the box than prior floor boxes. There is also a need for a floor box that does not require significant disassembly of activation hardware in the box.

SUMMARY OF THE INVENTION

This invention overcomes disadvantages of prior floor boxes for in-floor service distribution systems. A floor box is provided that defines an access opening, a central region within the box adjacent to the access opening, and wiring compartments extending from the central region sized to enclose connectors mounted in the wiring compartment adjacent to the connection region, and a conductor tunnel adjacent to the connection region through which connectors may be routed from one wiring compartment to another. A blocking plate that is removable through the access opening is positioned in the central region partitioning the central region into a connection region adjacent to the wiring compartments and a conductor tunnel adjacent to the wiring compartments. This invention allows removable barriers which prevent conductors in the conductor tunnel from entering one or more wiring compartments.

Accordingly, it is an object of the present invention to provide a floor box for connection to in-floor service distribution systems which allows a greater number of connectors to be mounted within the floor box and greater flexibility for configuring connectors for services than prior floor boxes.

Another object of the present invention is to provide a floor box in which connectors may be easily installed and removed.

Yet another object of the present invention is to provide a floor box for more than one service in which barriers may be selectively installed to separate services in the floor box.

Yet another object of the present invention is to provide a floor box in which conductors may be routed from a service distribution system connection of the floor box to any location in the floor box.

Yet another object of the present invention is to provide a water-tight floor box for in-floor service distribution systems that provides for activation of one or more services.

Yet another object of the present invention is to provide a water-tight floor box for use in concrete floors that provides for activation of one or more services and provides a barrier between services.

Yet another object of the present invention is to provide a floor box for use in on-grade concrete floors that allows conductors to pass through the box and provides a barrier between the conductors and other services in the box.

Yet another object of the present invention is to provide a floor box that allows installation and removal of connectors without removal or disassembly of all service connectors mounted within the floor box.

It is yet another object of the present invention to provide a floor box for use in a concrete floor which provides for attachment of a cover for abandonment of a previously activated floor box.

These and other objects and advantages of the present invention, as well as details of the preferred embodiment thereof, will be more fully understood from the following description and the drawings.

BRIEF DESCRIPTION OF THE DRAWINGS

FIGS. 1A through 4F each show a bottom view of a blocking plate with an alternative position for two conductor barriers.

In the following detailed description, spatially orienting terms are used such as "left," "right," "upward," "downward," and the like. It is to be understood that these terms are used for convenience of description of the illustrated embodiments by reference to the figures: unless so specified, these terms do not necessarily describe the absolute location in space, such as left, right, upward, downward, etc., that any part must assume.

DESCRIPTION OF THE ILLUSTRATED EMBODIMENTS

Figure 1:
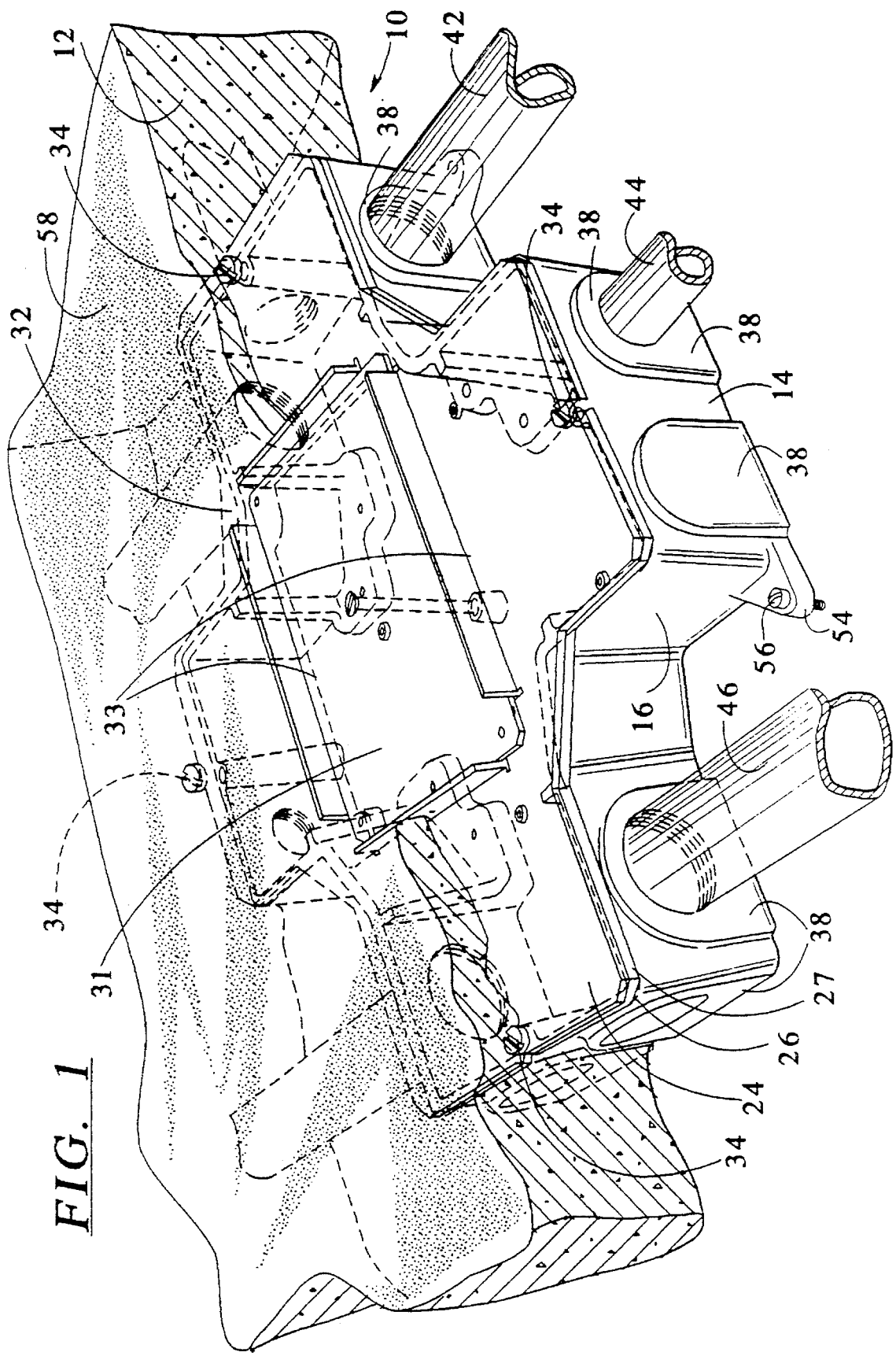
FIG. 1 is a perspective view of a floor box and cut away sections of attached conduit embedded in a concrete floor shown cutaway.

FIG. 1 shows a floor box 10 according to the present invention in a concrete floor 12. The floor box 10 includes a cast iron body 14 having a continuous side wall 16 and a bottom 18 (shown in FIG. 2) defining an interior 22 (shown in FIG. 2), a generally planar galvanized steel top 24 overlying the interior 22 and an upper edge 26 of the side wall 16 opposite the bottom 18.

Figure 2:
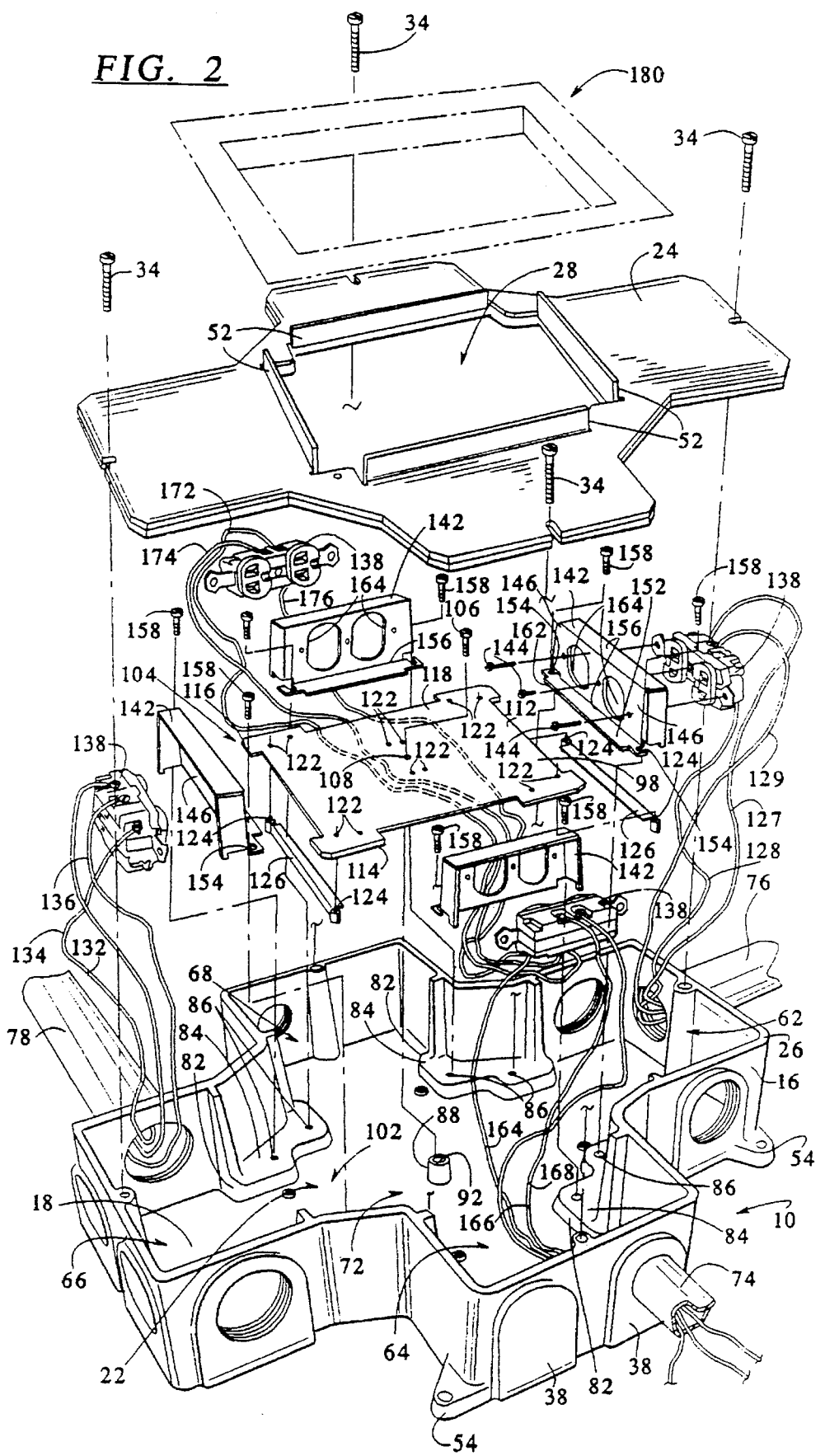
FIG. 2 is an exploded perspective view of the floor box shown by FIG. 1 including attached conduit and activation hardware.

The top 24 defines an access opening 28 (shown in FIG. 2). A hatch cover 32 sized to overlie the access opening is galvanized steel formed to have a cover section 31 and skirts 33 extending generally perpendicular to the cover section 31. The hatch cover 32 is sized to position the skirts 33 adjacent to the boundary of the access opening 28 to resiliently press against the top 24 adjacent to the access opening 28. The cover section 31 is formed to partially overlie the top 24 adjacent to the access opening 28.

A gasket 27 overlies and is secured to the top 24 and the hatch cover 32 adjacent to the body 14 by adhesive. The gasket 27 is weakened at the boundary of the access opening 28.

The top 24 is secured to the side wall 16 by screws 34 with the gasket 27 interposed between the top 24 and the upper edge 26. The gasket provides a water-tight seal between the top 24 and the side wall 16 and between the hatch cover 32 and the top 24.

The side wall 16 has conduit hubs 38 at which a service distribution system may be attached to the floor box 10. FIG. 1 shows cut away section of conduit 42, 44, and 46 extending from conduit hubs 38 which have been drilled and threaded, as shown in phantom for conduits 42 and 46, for conventional connection to conduit. The body 14, top 24, hatch cover 32, and attached service distribution system, such as conduits 42, 44, and 46, are water-tight preventing water or concrete from entering the interior 22 of the floor box 10 during pouring or setting of concrete floor 12.

The floor box 10 is supported prior to pouring of concrete floor 12 on a sub floor (not shown) by level adjusting screws 56, shown by FIG. 1, extending generally perpendicular to the top 24 beyond the bottom 18. The adjusting screws 56 engage support tabs 54 which extend from side wall 16 opposite the interior 22 adjacent to the bottom 18.

As shown by FIG. 2, walls 52 extend from top 24 adjacent the access opening 28 oppositely from bottom 18. The level adjusting screws position the floor box 10 so that the walls 52 extend to a location within the floor 12 and closely adjacent to the floor surface 58 (FIG. 1). After the concrete floor 12 is set, access may be gained, as is conventional, by tapping the floor surface 58 at the locations of walls 52 causing the concrete floor 12 between the walls 52 and floor surface 58 to crack. The concrete overlying the hatch cover 32 is removed providing access to the hatch cover 32. The hatch cover 32 is removed with the section of gasket 27 adhered to the hatch cover 32 providing access to the interior 22 through the access opening 28.

FIG. 2 is an exploded view of the floor box 10 and activation hardware. The side wall 16 of the floor box 10 defines an interior 22 including having wiring compartments 62, 64, 66, and 68 extending outwardly from a central region 72 in a direction generally parallel to the top 24. The conduit hubs 38 of the side wall 16 are adjacent the wiring compartments 62, 64, 66, and 68 so that conduit may be secured to the floor box 10 communicating with the wiring compartments, as conduits 74, 76, and 78 communicate with wiring compartments 64, 62, and 66, respectively.

As best shown by FIG. 2, a support land 82 extends into the central region 72 from the bottom 18 and the side wall 16 between each adjacent pair of wiring compartments. Each support land 82 is formed to have a mounting surface 84 generally parallel to and spaced from the bottom 18. Threaded mounting holes 86 extend into the lands 82 from the mounting surfaces 84.

A boss 88 extends into the central region 72 from the bottom 18 to the height of the mounting surfaces 84 above the bottom 18.

A steel blocking plate 98 is sized to overlie the bottom 18 within the central region 72 including the boss 88 and a section of each support surface 84. When positioned on the support surfaces 84 and boss 82, the blocking plate partitions the central region 72 into a conductor tunnel 102, defined by the bottom 18 and the blocking plate 98, and a connection region 104 defined by the blocking plate 98 and the top 24. The blocking plate is secured to the body 14 by screw 106 extending through hole 108 in the blocking plate 98 and engaging a threaded hole 92 in the boss 88.

The blocking plate 98 is bounded by edges 112, 114, 116, and 118 adjacent wiring compartments 62, 64, 66, and 68, respectively and overlies a section of each mounting surface 84. The edges 112, 114, 116, and 118 define the boundary of the blocking plate 98 so that the blocking plate 98 overlies a section of each mounting surface 84 without overlying the mounting holes 86.

The blocking plate 98 defines barrier mounting holes 122 at opposed positions along each edge, 112, 114, 116, and 118 adjacent to bosses 82. The holes 122 extend through the plate 98 and are sized to accept mounting pegs 124 of tunnel barriers 126. The tunnel barriers 126 are elongate members sized to extend from between the bottom 18 to the blocking plate 98. A barrier 126 engaging mounting holes 122 adjacent an edge of blocking plate 98 blocks communication between the adjacent wiring compartment and the conductor tunnel 102. The barriers 126 shown by FIG. 2 block communication between the wiring compartments 62 and 66 and the conductor tunnel 102.

Activation of the floor box 10 is effected by pulling conductors into one or more wiring compartments, 62, 64, 66, or 68, routing the conductors through the floor box 10, and connecting conductors to connectors and mounting the connectors within the floor box 10.

As shown by FIG. 2, conductors are routed into and connectors mounted within wiring compartments 62 and 66. Conductors 127, 128, and 129 enter wiring compartment 62 through conduit 76 and are connected to a power connector 138. Similarly, conductors 132, 134, and 136 enter wiring compartment 66 through conduit 78 and are connected to another power connector 138.

The power connectors 138 are secured to connector plates 146 of mounting brackets 142 by screws 144. A mounting plate 152 of each bracket 142 extends from an edge 156 of the connector plate 146. The mounting plate 152 is generally flat and is sized to extend across the width of the wiring compartments 62, 64, 66, and 68 from one adjacent land 82 across the wiring compartment to the other adjacent land 82 and to overlie a section of each mounting surface 84 of the adjacent lands 82. A slot 154 is formed in the mounting plate 152 that overlies each mounting surface 84 and is aligned with a mounting hole 86. The slots 154 extend from an edge of the mounting plate 152 closest to the adjacent wiring compartment. The mounting plate 152 is secured to the lands 82 by screws 158 extending through slots 154 engaging the holes 86. The heads of screws 158 are sized to overlie mounting plate 152 adjacent to slots 154.

The edges 112, 114, 116, and 118 of the blocking plate 98 generally conform to the edge 162 of the mounting plate 152 adjacent to the blocking plate 98. The mounting plate 152 and blocking plate 98 thereby define a boundary of the conductor tunnel 102 extending to the wiring compartment adjacent to the mounting bracket 142.

The connector plate 146 extends from an edge 156 at which it meets the mounting plate 152 away from the bottom 18 a distance to the top 24 and across opposed sections of the side wall 16 that define the wiring compartment. The connector plate is a barrier between the adjacent wiring compartment and the connection region 104. The connector 138 is secured to the connector plate 146 to extend into the adjacent wiring compartment, 62, 64, 66, or 68. The connector plate 146 defines openings 164 through which a plug connector (not shown) may engage the connector 138. The plug connector engaging the connector 138 will extend from the connector 138 through the openings 164 into the connection region 104.

As shown by FIG. 2, communication from the wiring compartments 62 and 66 to the conductor tunnel 102 is blocked by barriers 126 and communication to the connection region 104 is blocked by connector plates 146. The wiring compartments 64 and 68 are similarly separated from the connection region 104 by the brackets 142 but communicate with the conductor tunnel 102.

Conductors 164, 166, and 168 enter wiring compartment 64 from conduit 74 and are connected to connector 138 in that wiring compartment. Conductors 172, 174, and 176 are also connected to that connector 138 and are routed through the conductor tunnel 102 to wiring compartment 68 and connect to the connector 138 mounted in wiring compartment 68. The barriers 126 separate the conductors 172, 174, and 176 in the conductor tunnel 102 from the wiring compartments 62 and 66.

The access opening 28 in the top 24 is sized to allow activation hardware including the blocking plate 98, connectors 138 and mounting brackets 142 to be positioned in the interior 22 of floor box 10 through the opening 28. Additionally, mounting screws 106 and 158 are positioned to allow a tool extending through the access opening 28 to engage the screws 106 and 158 for installation and removal through the access opening 28.

As described above, the blocking plate 98 and the brackets 142 are independently secured to the boss 88 and the lands 82 respectively. The blocking plate 98 may be removed without removal of any brackets 142. When blocking plate 98 is not installed, removal and installation of brackets 142 requires that screws 158 only be unscrewed from the mounting holes 86 to separate the head of the screws 158 from the mounting plate 152. Because the slots 154 open toward the wiring compartment adjacent to the bracket 142, the bracket 142 may be removed after the screws 158 are partially unscrewed by sliding the bracket away from the adjacent wiring compartment into the section of the central region occupied by the blocking plate 98. The bracket 142 may be reinstalled by sliding the bracket into its mounted position and tightening the mounting screws 158.

An activation kit 180 (shown in phantom), such as that disclosed by U.S. Pat. No. 4,864,078, is conventionally mounted adjacent to the access opening 28.

Figure 3:
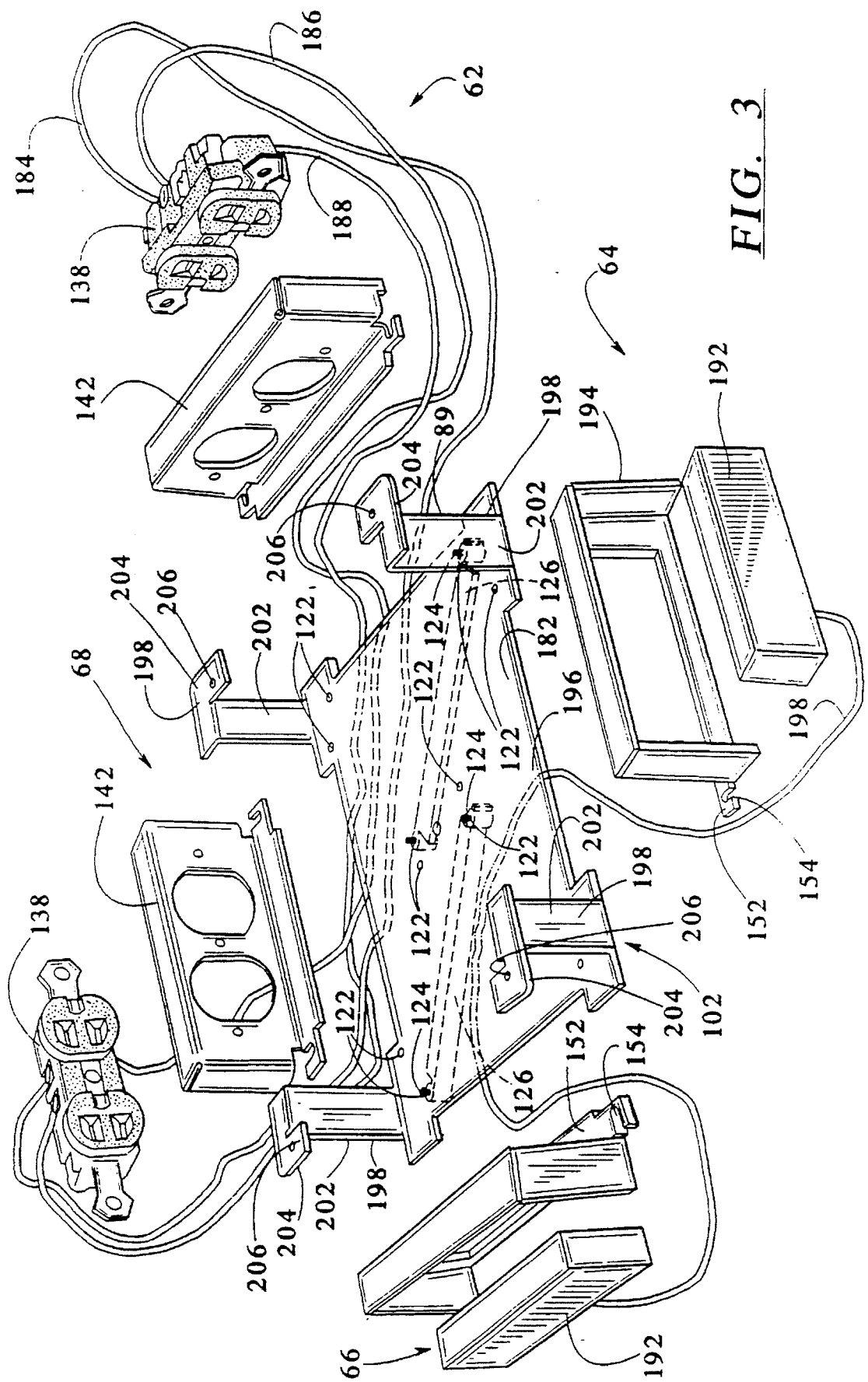
FIG. 3 is an exploded perspective view of an alternative activation configuration for the floor box of FIG. 2.

FIG. 3 shows an exploded view of an alternative configuration of connectors, conductors, and barriers 126 for the floor box 10. Blocking plate 182 and barriers 126 engaging mounting holes 122 of the blocking plate 182 define the conductor tunnel 102 to allow conductors 184, 186, and 188 to be routed from connector 138 in wiring compartment 62 through the conductor tunnel 102 to connector 138 in adjacent wiring compartment 68.

Communication connectors 192 are mounted to communication mounting brackets 194 in adjacent wiring compartments 64 and 66. The mounting brackets 194 include mounting plates 152 having slots 154, as described above, for mounting brackets 194 adjacent to wiring compartments 64 and 66 and forming the conductor tunnel 102. The cable 198 extends through the conductor tunnel 102 between connectors 192.

The barriers 126 mounted to holes 122 extend from a location adjacent to the land 82 between wiring compartments 64 and 62 to the central portion of the blocking plate 182 and from the land 82 between wiring compartments 66 and 68 to the central portion of the blocking plate 182 form a diagonal barrier in the conductor tunnel 102 allowing communication between wiring compartments 64 and 66 and between wiring compartments 62 and 68 and separating conductors on either side of that barrier.

The blocking plate 182 is formed having a blocking section 196 formed as blocking plate 98 described above and additionally having four bracket sections 198 extending toward access opening 28. One bracket section 198 extends from the blocking section 196 adjacent to each land 82. Each bracket section 198 includes a leg 202 extending from the blocking section toward the access opening 28 and mounting tab 204 extending from the leg 202 opposite the blocking section 196 and generally parallel to the blocking section 196. The mounting tab 202 includes a mounting hole 206 to which the activation kit 180 may be secured.

FIGS. 4A through 4F show alternative configurations in which two barriers 126 may be mounted to the blocking plate 98 to partition the conductor tunnel 102. FIG. 4A shows two barriers 126 positioned along adjacent edges, 112 and 114 allowing communication through the conductor tunnel 102 between wiring compartments 66 and 68 adjacent to edges 116 and 118 and blocking communication with wiring compartments 62 and 64 adjacent to edges 112 and 114 and the conductor tunnel 102. FIG. 4C shows two barriers 126 positioned along adjacent edges, 116 and 118 allowing communication through the conductor tunnel 102 between wiring compartments 62 and 64 adjacent to edges 112 and 114 and blocking communication with wiring compartments 66 and 68 adjacent to edges 116 and 118 and the conductor tunnel 102.

FIG. 4E shows two barriers 126 positioned along opposed edges 114 and 118 allowing communication through the conductor tunnel 102 between wiring compartments 62 and 66 adjacent to edges 112 and 116 and prevents communication between wiring compartments 64 and 68 adjacent to edges 114 and 118, respectively, and the conductor tunnel 102. FIG. 4F shows two barriers 126 positioned along opposed edges 116 and 112 allowing communication through the conductor tunnel 102 between wiring compartments 64 and 68 adjacent to edges 114 and 118, respectively, and prevents communication between wiring compartments 62 and 66 adjacent to edges 112 and 116, respectively, and the conductor tunnel 102.

FIG. 4B shows a barrier 126 positioned to extend from a location near the intersection of edges 114 and 112 to the boss 88 and a barrier 126 positioned to extend from a location near the intersection of edges 118 and 116 to the boss 88. This configuration allows communication between the wiring compartments 62 and 68 adjacent to edges 112 and 118, respectively, through a first conductor tunnel section 212 and between wiring compartments 64 and 66 adjacent to edges 114 and 116, respectively, through a second conductor tunnel section 214. The barriers 126 and the boss 88 separate the first and second conductor tunnel sections 212 and 214.

FIG. 4D shows a barrier 126 positioned to extend from a location near the intersection of edges 114 and 116 to the boss 88 and a barrier 126 positioned to extend from a location near the intersection of edges 118 and 112 to the boss 88. This configuration allows communication between the wiring compartments 62 and 64 adjacent to edges 112 and 114, respectively, through a third conductor tunnel section 216 and between wiring compartments 68 and 66 adjacent to edges 118 and 116, respectively, through a fourth conductor tunnel section 218. The barriers 126 and the boss 88 separate the third and fourth conductor tunnel sections 216 and 218.

As is evident from FIGS. 4A through 4F, other barrier configurations may be installed using one, three or four barriers 126. Four barriers may be use to combine the configurations of FIGS. 4E and 4F to block communication with all four wiring compartments 62, 64, 66, and 68 with the conductor tunnel 102. Removing one barrier would from that configuration would block communication of all wiring compartments 62, 64, 66, and 68 adjacent the remaining barriers with the conductor tunnel 102. A single barrier may be positioned in one location shown in FIGS. 4E and 4F to block communication with one wiring compartment 62, 64, 66, or 68 with the conductor tunnel 102.

The foregoing is a description of the preferred embodiments. The scope of this invention is determined, however, by reference to the following claims.

We claim:

1. A floor box for use with one or more in-floor service distribution systems comprising:

a bottom;

a continuous side wall extending generally perpendicularly from the bottom to an upper edge;

a top overlying the bottom adjacent to the upper edge defining a box interior;

the box interior including a central region extending from the bottom to the top, a first wiring compartment extending from the central region and a second wiring compartment wiring compartment spaced from the first wiring compartment and extending from the central region;

the sidewall adjacent to the first and second wiring compartments constructed for connection to and communication with a service distribution system;

a blocking plate positioned in the central region, the blocking plate overlying and being spaced apart from the bottom;

the blocking plate partitioning the central region to define a conductor tunnel between the blocking plate and the bottom and to define a connection region adjacent to the blocking plate opposite the conductor tunnel;

a first bracket positioned between the first wiring compartment and the connection region;

a second bracket positioned between the second wiring compartment and the connection region;

the top defining an access opening adjacent to the central region sized to allow insertion of the blocking plate, first bracket, and second bracket into the central region through the access opening; and the blocking plate, the first bracket, and the second bracket being separate from one another and removably secured to the body at separated locations, whereby the blocking plate, first bracket, and the second bracket are each independently removable through the access opening.

2. The floor box of claim 1 wherein the bottom and sidewall comprise a unitary body.

3. The floor box of claim 2 wherein the body is cast iron and the top is steel and further comprising a gasket positioned between the upper edge of the side wall and the top is secured to the side wall.

4. The floor box of claim 1 further comprising a tunnel barrier sized and positioned to prevent communication between the first wiring compartment and the conductor tunnel.

5. The floor box of claim 4 wherein the tunnel barrier is secured to the blocking plate adjacent to the first wiring compartment and positioned between the blocking plate and the bottom.

6. The floor box of claim 5 wherein the blocking plate defines a barrier mounting hole at a location adjacent to the first wiring compartment and the tunnel barrier defines a peg sized for insertion through the barrier mounting hole whereby the tunnel barrier is removably secured to the blocking plate.

7. The floor box of claim 1 further comprising a plurality of support lands formed in the bottom and positioned to support the blocking plate above the bottom.

8. The floor box of claim 7 wherein the support lands are positioned to support the brackets.

9. The floor box of claim 8 wherein the brackets are releasably securable to the support lands.

10. The floor box of claim 9 wherein the support lands carry mounting screws and the brackets have slots positioned to slidable engage over the mounting screws.

* * * * *